United States Patent
Woelfel

(10) Patent No.: US 7,014,449 B2
(45) Date of Patent: Mar. 21, 2006

(54) PROCESS AND APPARATUS FOR FORMING DUAL HOSE CUFFS, HOSE, E.G. CORRUGATED HOSE, PROVIDED WITH CUFFS, HOSE CUFFS AND HOSE, E.G. CORRUGATED HOSE, PROVIDED WITH CUFFS FORMED BY SUCH PROCESS

(75) Inventor: Mark E. Woelfel, Oak Ridge, NJ (US)

(73) Assignee: Vital Signs, Inc., Totawa, NJ (US)

( * ) Notice: Subject to any disclaimer, the term of this patent is extended or adjusted under 35 U.S.C. 154(b) by 284 days.

(21) Appl. No.: 10/278,198

(22) Filed: Oct. 22, 2002

(65) Prior Publication Data

US 2004/0074552 A1   Apr. 22, 2004

(51) Int. Cl.
  *B29C 53/22* (2006.01)
(52) U.S. Cl. .................. 425/326.1; 425/396; 425/303; 425/336
(58) Field of Classification Search ............. 425/326.1, 425/392–393, 303, 336, 396, 532
See application file for complete search history.

(56) References Cited

U.S. PATENT DOCUMENTS

| | | | | |
|---|---|---|---|---|
| 3,286,305 A | * | 11/1966 | Seckel | 425/378.1 |
| 4,003,685 A | * | 1/1977 | Maroschak | 425/532 |
| 5,405,569 A | * | 4/1995 | Lupke | 425/326.1 |
| 5,996,639 A | | 12/1999 | Gans et al. | 138/115 |
| 6,764,627 B1 | * | 7/2004 | D'Angelo | 425/393 |

\* cited by examiner

*Primary Examiner*—Duane Smith
*Assistant Examiner*—Thu Khanh T. Nguyen

(74) *Attorney, Agent, or Firm*—R. Gale Rhodes, Jr.

(57) ABSTRACT

Apparatus and process for forming dual hose cuffs for being split to provide one hose cuff on one length of hose, particularly a corrugated hose, and another hose cuff on another length of hose, particularly a corrugated hose. Cuffs, or hose cuffs, formed by such process. Hose, particularly corrugated hose, provided with cuffs formed by such process.

4 Claims, 12 Drawing Sheets

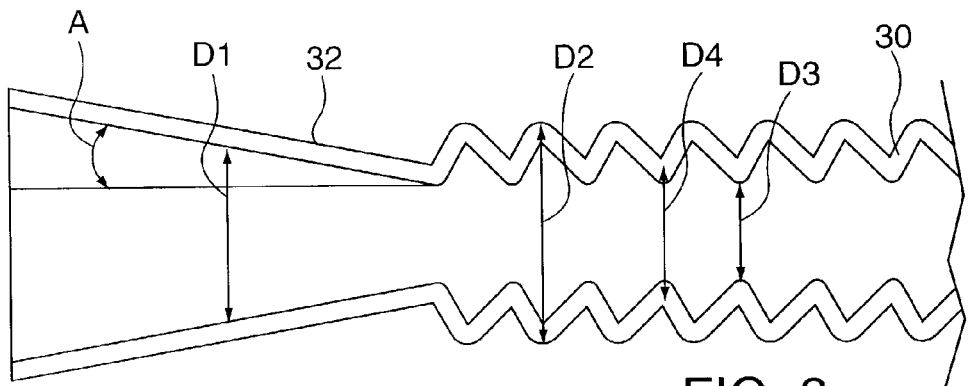
FIG. 8
PRIOR ART
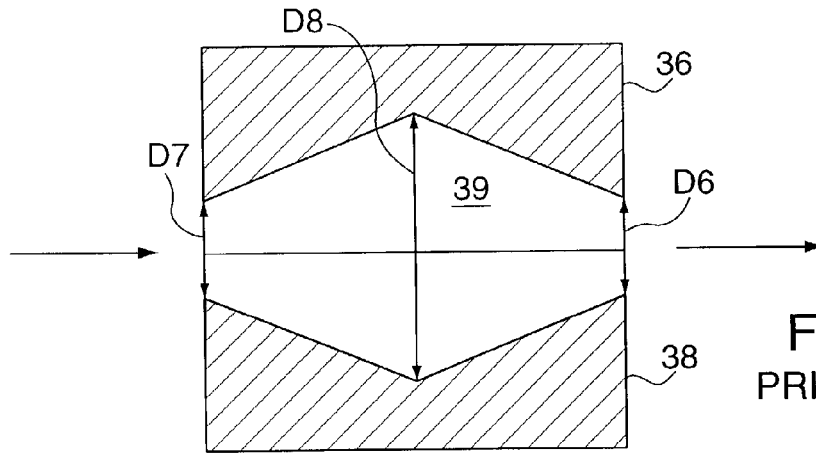
FIG. 9
PRIOR ART
FIG. 10
PRIOR ART
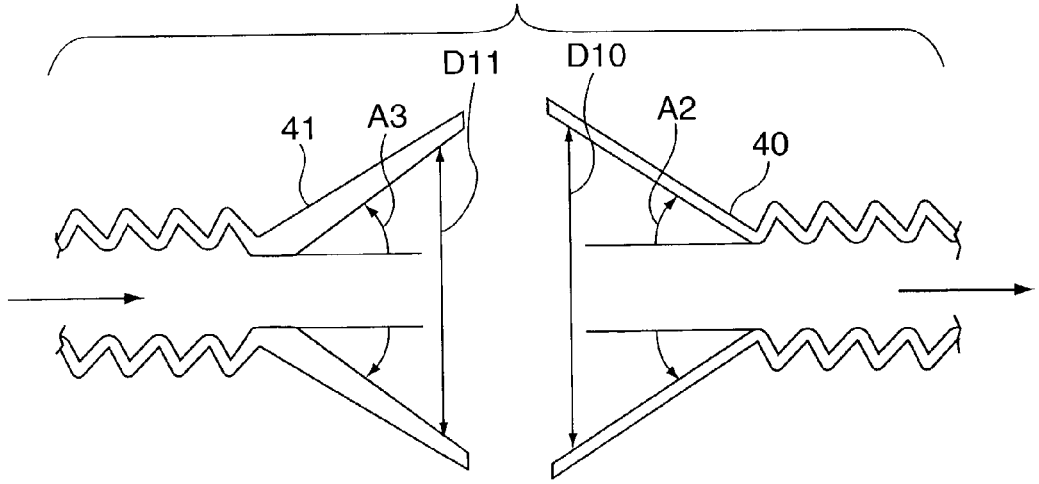

PROCESS AND APPARATUS FOR FORMING DUAL HOSE CUFFS, HOSE, E.G. CORRUGATED HOSE, PROVIDED WITH CUFFS, HOSE CUFFS AND HOSE, E.G. CORRUGATED HOSE, PROVIDED WITH CUFFS FORMED BY SUCH PROCESS

BACKGROUND OF THE INVENTION

This invention relates to process and apparatus for forming hose cuffs, hose, particularly corrugated hose, provided with cuffs, hose cuffs and hose, particularly corrugated hose, provided with cuffs formed by such process. This invention further relates to apparatus and process for forming dual hose cuffs for being split to provide one hose cuff on one end of a length of corrugated hose and another hose cuff on another length of corrugated hose.

Typical prior art corrugated hose is shown in FIG. 1 and indicated by general numerical designation 10. The hose 10 is provided at its opposed ends with what are referred to in the art as cuffs, or hose cuffs, and which are identified in FIG. 1 by numerical designations 11 and 12. The corrugated hose 10, as further known to the art, is used to communicate various gases, such as for example, breathing gas to a patient and exhalation gas away from the patient, anesthesia gas to the patient, and the like. For such gas communication, as further known in the art, the hose cuffs 11 and 12 are for connecting the hose 10 to various connectors provided, for example, ventilation machines, anesthesia machines, the proximal end of an endotracheal tube, a face mask connector, and the like. The cuffs 11 and 12 fit over the connectors on such devices whose connectors typically are referred to in the art as male connectors. Since the hose cuffs fit over such male connectors, such hose cuffs are typically referred to as female connectors. Such male and female connectors, as further known to the art, engage in a sliding wedged, or slight interference fit, to provide a fluid-tight connection or fit. A diagrammatical example of such fluid-tight connection is shown in FIG. 2. An anesthesia machine 13, for example, is provided with an outwardly extending and inwardly tapered conical male connector 14 for fluid-tight connection with the female hose cuff 12 provided on the hose 10. Accordingly, it will be further understood that the hose cuff 12 for such connection is an outwardly tapered conical female hose cuff for the above-noted sliding wedge, or slight interference fit, to provide a secure and fluid-tight engagement or connection with the conical male connector 14. It will be understood that the conicalness of the female hose cuff 12 and the male connector 14 are standard tapers for the medical industry and are thus exaggerated in FIG. 2 for clarity of presentation and ease of understanding.

Typical prior art process and apparatus for continuously forming successive lengths or sections of corrugated hose or tubing separated by intermediate sections of dual cuffs are shown in FIG. 3; such successive sections of corrugated hose and intermediate dual cuffs are illustrated diagrammatically in FIG. 3 and identified by general numerical designation 15. The hose and dual cuffs 15 include representative sections or lengths of corrugated hose 16a, 16b and 16c separated by intermediate dual cuffs 18a and 18b. The apparatus illustrated in FIG. 3 includes an extruder 19 for continuously extruding a hollow tube of deformable material 20 between opposed elliptical trains of forming blocks identified respectively by general numerical designations 21 and 22.

As indicated diagrammatically in FIG. 4, the dual cuffs 18a and 18b are dual cuffs in the sense that after forming they cut transversely through their middle to provide two cuffs. Dual cuff 18a, upon being cut transversely through its middle, provides one hose cuff on an end of the corrugated hose 16a and another hose cuff on one end of the corrugated hose 16b, and, dual cuff 18b upon being cut transversely through its middle, provides one hose cuff on one end of the end of corrugated hose 16b and one hose cuff on one end of the end of corrugated hose 16c.

Referring again to FIG. 3, the trains of deforming blocks 21 and 22 include pairs of corrugation blocks for forming the lengths or section of corrugated hose 16a–16c and pairs of dual cuff blocks for forming the dual cuffs 18a and 18b. As is further known, the trains 21 and 22 bring these blocks into pairs of opposed and engaged blocks as indicated diagrammatically in FIG. 3 by the representative pair of opposed and engaged corrugation blocks 24a and 24b and by representative pairs of engaged and opposed dual cuff blocks 26a and 26b. As illustrated diagrammatically in FIG. 5, with regard to representative opposed pairs of corrugation forming blocks 24a and 24b, upon being placed into opposed engagement by the trains 21 and 22 (FIG. 3), the internal corrugation forming surfaces of these blocks form a generally cylindrical, although irregularly shaped due to the internal corrugation forming surfaces, cylindrical corrugation forming chamber indicated diagrammatically in FIG. 5 by numerical designation 24c.

The trains of corrugation and cuff forming blocks 21 and 22 shown in FIG. 3 may be generally of the type described and shown in FIGS. 5 and 6 of U.S. Pat. No. 5,996,639 which is hereby incorporated herein by reference as if fully reproduced herein and the trains of blocks described and disclosed in U.S. Pat. No. 3,286,305 which is hereby incorporated herein by reference as if fully reproduced herein. In FIG. 5 of incorporated U.S. Pat. No. 5,996,639, blow molding apparatus is shown for forming corrugated tubing or hose and in FIG. 6 vacuum assisted blow molding apparatus is shown. Referring again to FIG. 3, it will be understood that in the prior art process illustrated the lengths or sections of corrugated tubing or hose and dual cuffs are formed by vacuum assisted blow molding wherein pressurized air is supplied to the interior of the tubing 20 by the air pressure nozzle 19a shown in FIG. 3 to assist the vacuum provided through the block vacuum lines provided in the forming blocks as shown in detail in FIGS. 6 and 7 and described below.

With further regard to the corrugation blocks, a representative opposed pair of corrugation blocks 24a and 24b are shown partially and diagrammatically in enlarged cross-section in FIG. 6. The deformable tubing 20 is fed forwardly as indicated by the arrow in FIG. 6 between the corrugation blocks 24a and 24b, pressurized air is forced into the interior of the material 20 from the pressurized air nozzle 19a (FIG. 3), and vacuum is drawn against the tubing through the vacuum lines 27—27 to expand the tube 20 radially outwardly so as to force the tube 20 into engagement with the corrugated forming surfaces 24c and 24d of the corrugation blocks 24a and 24b to form, as indicated diagrammatically, the corrugated section or length of corrugating hose 16b.

As noted above with regard to FIGS. 1 and 2, the cuffs 11 and 12 are conical female cuffs tapering outwardly as indicated diagrammatically by the exaggerated conicalness of the cuff 12 as shown in FIG. 2. Accordingly, it will be understood that in the prior art the opposed pair of dual cuff forming blocks 26a and 26b, illustrated diagrammatically in cross-section and enlarged partial view in FIG. 7, are provided with opposed dual cuff forming surfaces 28a and 28b. The deformable tube 20 is fed forwardly, typically at a constant rate, between the dual cuff forming blocks 26a and 26b and vacuum is drawn in the vacuum lines 29—29 to force a section of the deformable tube 20 radially outwardly and into engagement with the cuff forming surfaces 28a and 28b to form the dual cuff 18b.

As is further known to those skilled in the art, at present, hose cuffs and mating connectors are increasingly designed for compliance with International Standards Organization (ISO) standards for such hose cuffs and connectors whereby the conical male connector will have an outer diameter and the female hose cuff will have an inner diameter of 22 mm and a taper angle stated in three places as 0.716° taper per side which is a taper of one inch over a length of 40 inches. It will be understood that even though such male connectors and female cuffs are tapered and are therefore conical, and in actuality due to such conicalness have slightly varying inner and outer diameters along their length due to such slight taper, less than 1° taper per side, such ISO diameters are referred to in the art as the above-noted 22 mm diameters.

Shown in FIG. 8 is a length of corrugated hose 30 provided with a hose cuff 32 conforming to the above-noted ISO standards. That is, the hose cuff 32 has an inner diameter D1 of 22 mm and a taper angle A of approximately 0.716°. The corrugated hose section of axial length 30 is an outer diameter D2, an inner diameter D3, and an average diameter of D4. As further known to those skilled in the art, to prevent air flow constrictions at the hose cuff, or the connection provided by the hose cuff, the hose cuff diameter D1 is larger than the average diameter D4 of the corrugated hose 30. With further regard to FIG. 8, it will be understood that the conicalness of the hose cuff 32 is exaggerated merely for purposes of clarity of understanding.

Desirably, in connection with satisfying the above-noted ISO standards, the above-noted prior art process and apparatus shown in FIG. 3 for forming corrugated hose and dual cuffs would provide dual cuffs which, upon being split through their middle as shown in FIG. 4, would provide two hose cuffs which would conform to the ISO standards, namely, each such hose cuff would have an inner diameter of 22 mm and a total taper angle of 1.43°, or would deform to fit such a connector.

In the prior art, and as illustrated generally in FIG. 9, the dual cuffs are formed by symmetrical dual cuff forming blocks such as the symmetrical dual cuff forming blocks 36 and 38. Such symmetrical dual cuff forming blocks provide a dual cuff forming chamber 39 having a leading diameter D6, a trailing diameter D7 and a middle diameter D8. The leading diameter D6 and the trailing diameter D7 are leading and trailing diameters in the sense of the direction of hose cuff, and of course corrugated hose, forming as indicated by the arrows in FIG. 9. The dual cuff forming blocks 36 and 38 are symmetrical dual cuff forming blocks in the sense that the leading diameter D6 and the trailing diameter D7 are equal and are equally spaced from the middle diameter D8. Again, it will be understood, in FIG. 9, that the conicalness of the dual cuff forming chamber 38 is exaggerated for clarity of presentation and understanding. The diameters D6, D7 and D8 may also be referred to as the diameters of the dual cuff forming blocks 36 and 38.

It has been found, typically, that upon the symmetrical dual cuff forming blocks 36 and 38 of FIG. 9 being designed to form cuffs satisfying ISO standards, that such dual cuffs upon being split do not provide two dual cuffs each of which conforms to the above-noted ISO standards, but instead, such symmetrical dual cuff forming blocks typically provide dual cuffs which upon being split form two hose cuffs neither of which conforms to the noted ISO standards. This is because it has been found that even though such dual cuff forming blocks 36 and 38 are designed to form dual hose cuffs conforming to the ISO standards, as the dual cuffs are formed using such symmetrical cuff forming blocks, the dual cuffs begin with a narrow thickness which increases in thickness gradually but continuously as the dual cuffs are being formed and which thickness increases in thickness in the direction opposite to the direction in which such dual cuffs are being formed. This is illustrated diagrammatically in FIG. 10 by the two hose cuffs 40 and 41 formed, typically, by such symmetrical dual cuff forming blocks. It has been found, typically, that due to such increase in thickness, that the first hose cuff 40 formed (FIG. 10) will have an inner diameter D10 larger than 22 mm and a taper angle 18 larger than 0.716°. Hence, the hose cuff 40 will be too large to engage an ISO tapered male connector in an air-tight fit. The second formed hose cuff 41 will have an inner diameter D11 smaller than 22 mm and a taper angle A3 smaller than 0.716° and hence will provide a hose cuff too small to engage an ISO tapered male connector in an air-tight fit. It is believed that the reason for the increase in thickness and forming of such two non-conforming hose cuffs is illustrated in FIGS. 11–14. It will be further understood with regard to the sequential dual cuff and corrugated tube forming illustrated in FIGS. 11–14 that such is in the context of using the symmetrical cuff forming blocks 36 and 38 of FIG. 9 designed to provide dual cuffs which upon being split transversely through the central apex were intended to provide two hose cuffs which conform to the above-noted ISO standards, namely, each hose cuff having an inner diameter of 22 mm and a taper angle of 0.716° per side, so that such hose cuffs can engage ISO tapered male fittings in a fluid-tight and mechanically secure engagement.

Referring to FIG. 11, a hollow tube of deformable material 42 is being advanced at a constant rate in the direction of the arrows and opposed pairs of corrugation blocks, 43 and 44 and 45 and 46, have engaged a portion of the tube 42 and formed a first section or length of corrugated hose 48, the pairs of dual cuff forming blocks 36 and 38 (FIG. 9) have not yet engaged the tube 42. Referring further to FIG. 13, it will be understood that the first formed hose cuff 50 and the second formed hose cuff 52 combine to form a dual hose cuff indicated by general numerical designation 53. It will be further noted from FIG. 13 that the dual hose cuff 53 increases in thickness in a direction opposite to the direction of forming indicated by the arrows in FIG. 13.

As shown in FIG. 12, the symmetrical cuff forming blocks 36 and 38 have begun to engage the tube of formable material 42, advancing at a constant rate, and have formed what will become a first hose cuff 50. As noted above with regard to FIG. 8, to prevent gas flow constriction, the inner diameter D1 of the hose cuff 32 (FIG. 8) is larger than the average diameter D4 of the corrugated hose or tubing 30 (FIG. 8) and hence to begin to form such hose cuff 50 of FIG. 12, the tube 42 must expand further radially outward than is required to form the corrugated hose 48 of FIG. 12. Hence, it will be understood that, in essence, as the hose cuff 50 of FIG. 12 begins to be formed there will be, momentarily, a lack of sufficient tube material 42 to expand radially outwardly at the thickness of the corrugated hose or tubing 48 and hence the beginning of the forming of the hose cuff 50 it will have a thickness narrower than the thickness of the corrugated tubing 48 but which thickness will increase gradually, as shown in FIG. 12, toward the central apex C of the dual cuff to be formed. As the hose cuff 50 is being formed, the material of the tube 42 advancing at a constant rate, in essence "catches up" with the radial outward expansion material demand required to form the hose cuff 50. This phenomenon occurs as extrusion speeds increase relative to the melt flow of the parison.

Referring to FIG. 13, the opposed pair of dual cuff forming blocks 36 and 38 have further engaged the advancing tube 42 and have formed the second hose cuff 52 of the dual hose cuff formed. It will be noted, as the material of the tube 42 continues, in essence, "to catch up," the thickness of the second formed hose cuff 52 continues to increase in thickness from the circular apex C back toward the direction in which the tube 42 is advancing and, as illustrated in FIG. 13, concludes with the formation of the second to be formed hose cuff 52 with an end thickness equal to, or at least substantially equal to, the thickness of the tube 42.

As further illustrated in FIG. 14, the forming process continues and the pair of opposed corrugation cuff forming blocks 54 and 55 engage a portion of the tube 42 and form a second section or length of corrugated hose 58. It will be understood, from FIG. 14, that the dual cuff including the first formed hose cuff 50 and the second formed hose cuff 52 will be of the type shown in FIG. 10 and described above, namely, the first formed hose cuff 50 will have an inner diameter and a taper angle generally the same as the hose cuff 40 shown in FIG. 10 or an inner diameter that is too large and a taper angle different than an ISO tapered male fitting causing a loose connection. Similarly, the second formed hose cuff 52 will be of the type of the hose cuff 41 shown in FIG. 10, namely, the second formed hose cuff 52 will have an inner diameter and a taper angle different than ISO standards and hence will not easily engage a tapered male ISO fitting in a fluid-tight engagement.

SUMMARY OF THE INVENTION

Apparatus and process for forming dual hose cuffs for being split to provide one hose cuff on one length of hose, particularly a corrugated hose, and another hose cuff on another length of hose, particularly a corrugated hose. Cuffs, or hose cuffs, formed by such process. Hose, particularly corrugated hose, provided with cuffs formed by such process.

DESCRIPTION OF THE DRAWINGS

FIG. 8 is a side view of a length of prior art corrugated hose having one end provided with a conical or female hose cuff;

FIG. 9 is a diagrammatical cross-sectional view of prior art symmetrical dual cuff forming blocks, D7 equals D6;

FIG. 10 illustrates the wall thickness problem associated with dual cuffs formed by symmetrical dual cuff forming blocks known to the prior art running at a high proportional speed;

DETAILED DESCRIPTION OF THE INVENTION

Figure 15:
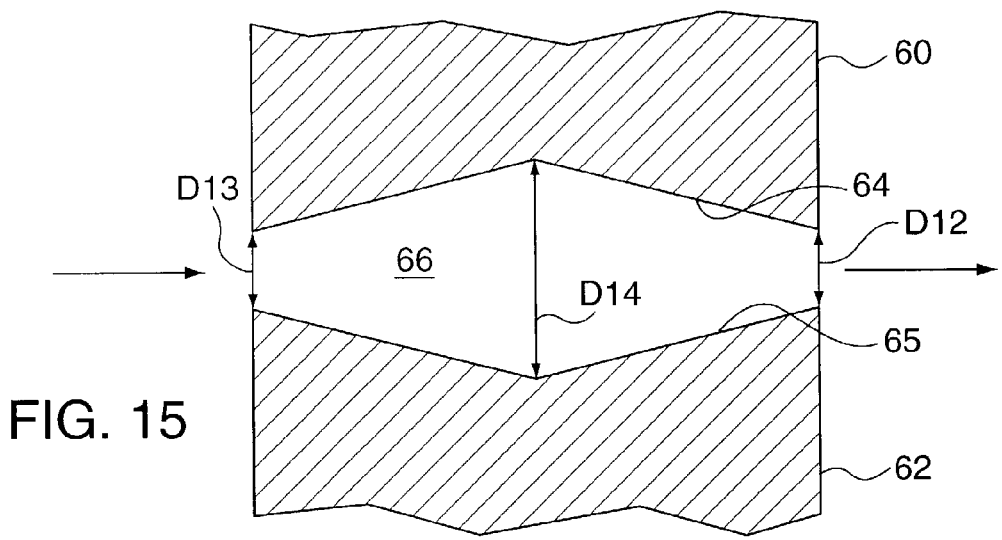
FIG. 15 is a partial cross-sectional view of asymmetrical dual cuff forming blocks of the present invention.
Figure 16:
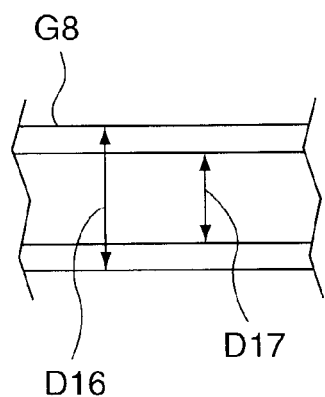
FIG. 16 is a partial diagrammatical view of a hollow tube of deformable material useful in the practice of the present invention.

Referring to FIG. 15, there is illustrated a pair of opposed asymmetrical dual hose cuff forming blocks 60 and 62 embodying the present apparatus invention, which dual cuff blocks may be utilized to practice the process of the present invention and which form hose cuffs and hose with cuffs of the present invention formed by the process of the present invention. Such asymmetrical dual cuff forming blocks in accordance with the present invention have a leading diameter D12, a trailing diameter D13 and a middle diameter D14, again with such leading diameter and trailing diameter being in the sense of the material forming direction indicated by the arrows in FIG. 15. It will be understood that in accordance with the present invention the leading diameter D12 is smaller than the middle diameter D14 and smaller than the trailing diameter D13, and the trailing diameter D13 is smaller than the middle diameter D14. Thus, in the sense that the leading and trailing diameters are not equal, the dual cuff forming blocks 60 and 62 of FIG. 15 are asymmetrical dual cuff forming blocks. The asymmetrical cuff blocks 60 and 62 provide opposed dual cup forming surfaces 64 and 65 which cooperatively provide a dual cuff forming chamber 66. It will be generally understood that the asymmetrical dual cuff forming blocks in the preferred embodiment of the present invention are for forming a dual cuff which upon being split transversely along its middle or central apex provides two hose cuffs each having an inner diameter of 22 mm and a taper angle of 0.716° per side whereby both such hose cuffs conform to the above-noted ISO standards for female cuffs for mating in fluid-tight engagement with an outwardly tapered ISO conforming male connector. In the preferred embodiment of asymmetrical cuff blocks 60 and 62 of FIG. 15, the leading diameter D12 was 0.920", the trailing diameter D13 was 0.960" and the middle diameter D14 was 1.040"; the axial length or distance between the leading diameter D12 and the middle diameter D14, and the axial distance or length between the trailing diameter D13 and the middle diameter D14, was 1.000". Such asymmetrical dual cuff forming blocks were utilized to form such dual cuff from a hollow tube of deformable material 68 shown in FIG. 16 which, in such preferred embodiment of the invention, was a parison of extruded polyethylene having an outer diameter D16 of 0.50" and an inner diameter D17 of 0.40." The tube of polyethylene 68 was advanced at a constant rate of 30' per minute.

Figure 1:
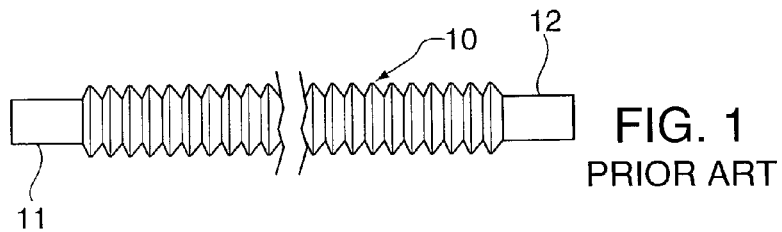
FIG. 1 is a side view of prior art corrugated hose provided at opposite ends with cuffs, or hose cuffs.
Figure 2:
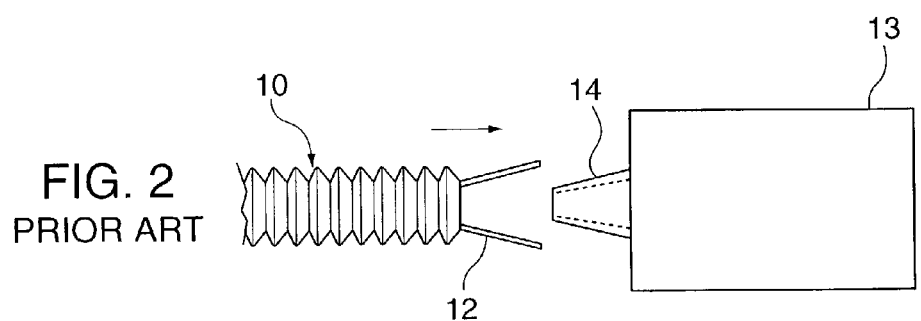
FIG. 2 illustrates the fluid-tight connection between a prior art male connector and a prior art cuff or hose cuff.
Figure 3:
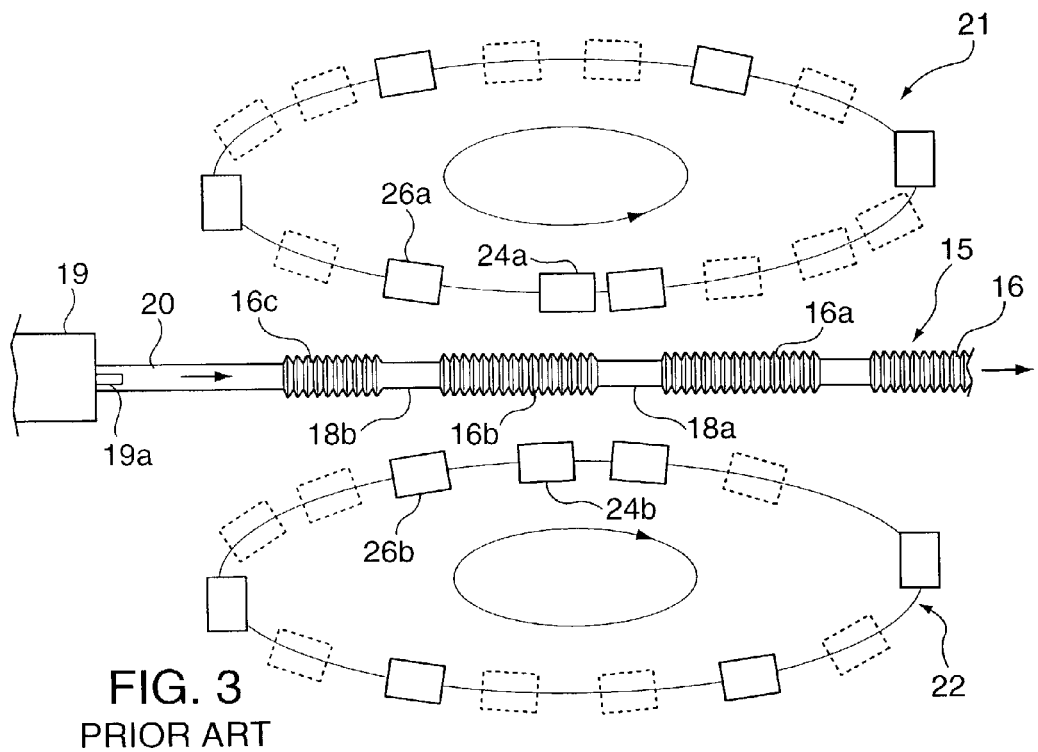
FIG. 3 illustrates, diagrammatically, prior art trains of forming blocks for forming successive lengths of corrugated hose with intermediate dual cuffs.
Figure 4:
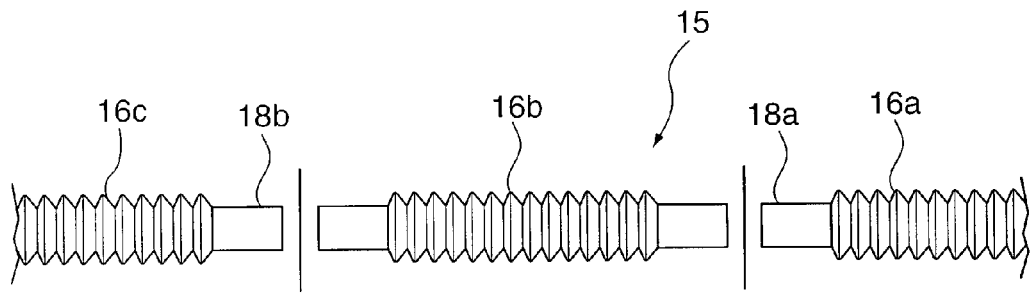
FIG. 4 illustrates the splitting of prior art dual cuffs to provide one cuff on one end of one length of corrugated hose and another cuff on another end of another length of corrugated hose.
Figure 6:
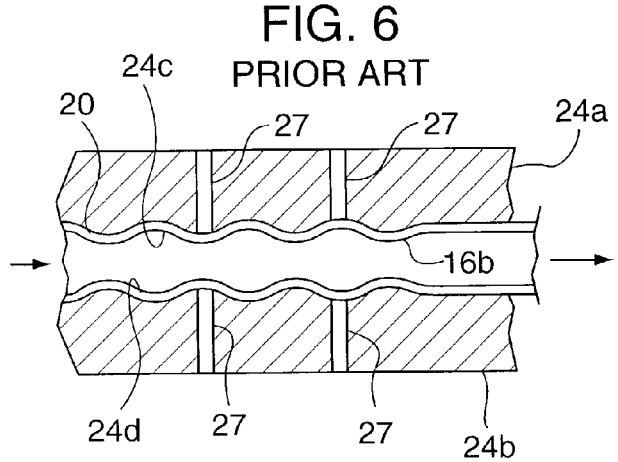
FIG. 6 is a partial diagrammatical cross-sectional view of a pair of prior art forming blocks for forming corrugated hose using vacuum assisted blow molding or forming.
Figure 5:
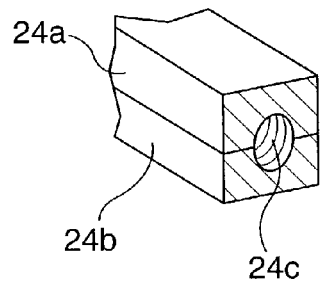
FIG. 5 is a partial diagrammatical, perspective view of a pair of engaged prior art cuff forming blocks.

Referring further to the present invention, it will be assumed that the asymmetrical dual cuff blocks 60 and 62 of FIG. 15 were substituted for the pairs of opposed dual cuff forming blocks 26a and 26b shown in FIG. 3 and, that otherwise, the apparatus and process illustrated in FIG. 3 were practiced as described above to form successive lengths of corrugated hose with intermediate dual cuffs of the present invention.

Figure 17:
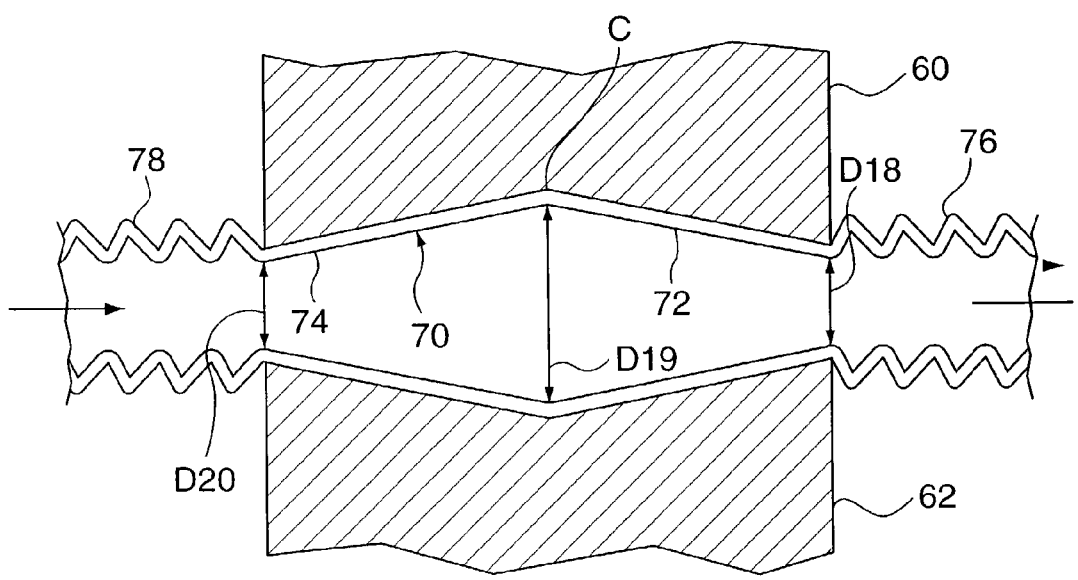
FIG. 17 is a partial diagrammatical cross-sectional view of a pair of asymmetrical cuff forming blocks of the present invention forming a dual cuff between two lengths or section of corrugated hose.

FIG. 17 illustrates a dual cuff and lengths of corrugated hose 76 and 78 formed by the apparatus and process of the present invention, namely, such dual cuff is identified in FIG. 17 by general numerical designation 70. The dual cuff 70 includes a first formed hose cuff 72 and a second formed hose cuff 74. As described above with regard to the dual cuff formed by the symmetrical dual cuff blocks 36 and 38 of FIG. 9, the dual cuff 70 formed by the asymmetrical dual cuff blocks 60 and 62 in FIG. 17, also forms, and for the same reason set forth above with regard to the symmetrical cuff blocks 26a and 26b of FIG. 7, a first formed hose cuff 72 which increases in thickness from a leading inner cuff diameter D18 of 0.500" to a middle dual cuff diameter D19 or central apex C of 1.000" and forms a second hose cuff 74 which further increases in thickness from the middle inner cuff diameter D19 or central apex C to a trailing inner cuff diameter D20 also of 0.500". In this embodiment, the axial length or distance between the leading diameter D18 and the middle diameter D19 and the axial length or distance between the middle diameter D19 and the trailing diameter D20 was 1.000".

Figure 18:
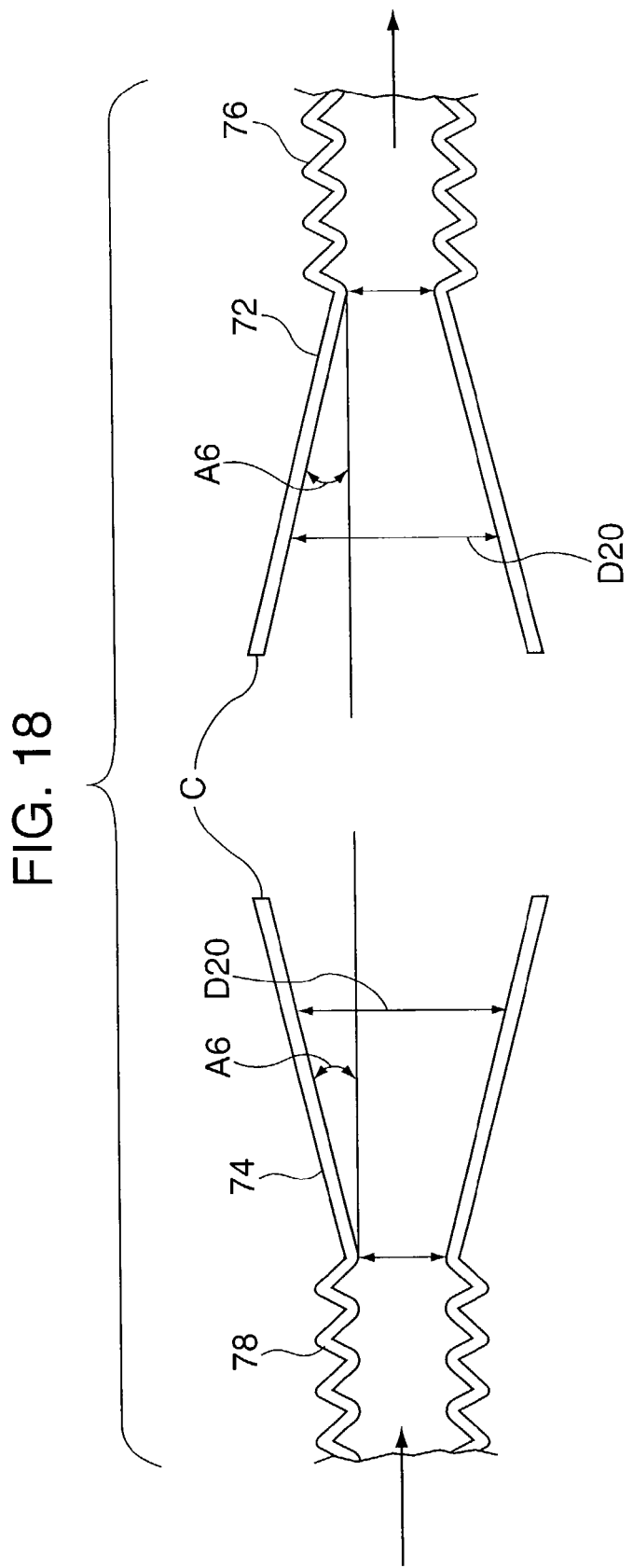
FIG. 18 is a diagrammatical view of the splitting of dual cuffs formed by the asymmetrical cuff forming blocks of the present invention which upon being split provide cuffs having the same internal dimensions.

Referring to FIG. 18, it has been discovered that due to the asymmetry of the dual cuff blocks of the present invention, that upon the dual cuff 70 of FIG. 17 being split transversely along its central apex C, the first formed hose cuff 72 and the second formed hose cuff 74, although each of such hose cuffs increase in thickness as shown, will both have the same inner diameter D20 of 22 mm and the same taper angle A6 of 0.716° per side. Hence, it will be understood that in accordance with the teachings of the present invention, although both such hose cuffs have the noted increased wall thicknesses, the resultant inner diameters and angles of taper satisfy the above-noted ISO standards for tapered hose cuffs and thereby each such hose cuff will engage a tapered male fitting conforming to the ISO standards in a secure and fluid-tight fit or engagement.

Figure 19:
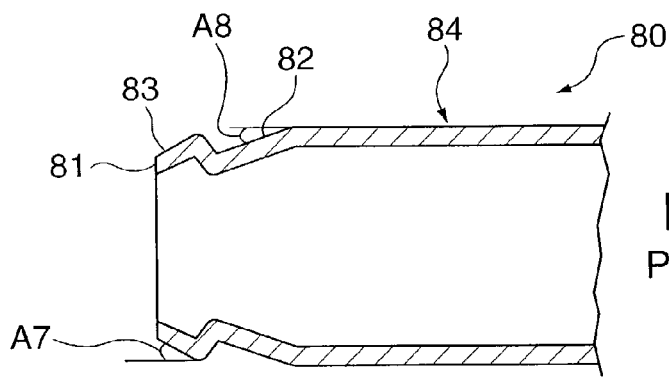
FIG. 19 is a partial cross-sectional view of a prior art locking male connector.

As still further known to those skilled in the art, locking male connectors are known and an example of such locking male connector is illustrated diagrammatically and in cross-section in FIG. 19 and indicated by general numerical designation 80. The locking male connector 80 includes an outer annular ridge 81 and a reduced diameter or tapered portion 82 contiguous to the annular ridge 81. The annular ridge 81 is provided with a tapered edge 83 having a taper angle A7 of about 6°. The tapered portion 82 has a taper angle A8 of about 7°. Further, the locking male connector 80 has a slightly outwardly tapered outer conical sealing surface portion indicated by general numerical designation 84.

Figure 20:
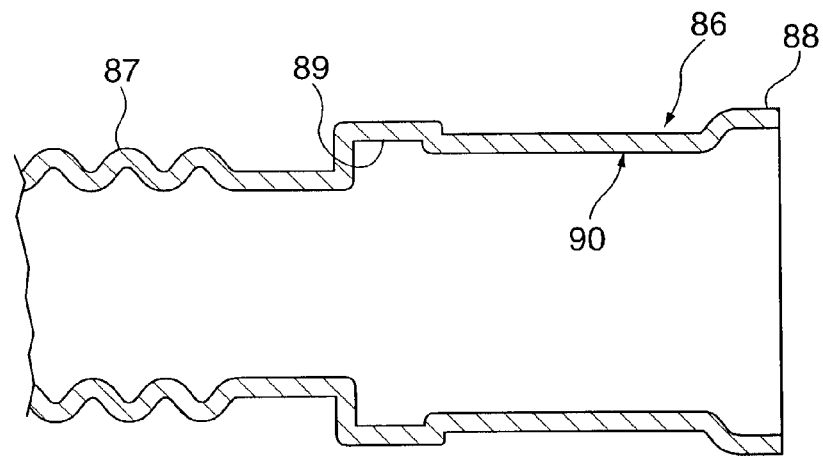
FIG. 20 is a partial cross-sectional view of a prior art locking female cuff provided on one end of a length of corrugated hose.

Further known to the art are locking female cuffs, or locking female hose cuffs, and a typical prior art locking female hose cuff is shown diagrammatically and in cross-section in FIG. 20 and indicated by general numerical designation 86. The locking female hose cuff 86 is shown in FIG. 20 formed integrally on one end of a corrugated hose 87. The female locking hose cuff 86 includes an outer radially outwardly extending annular portion 88, an inner radially outwardly extending annular recess 89 and a slightly inwardly tapered inner conical sealing surface portion indicated by general numerical designation 90. It will be generally understood that the tapered conical inner sealing surface portion 90 of the female locking cuff 86 of FIG. 20 is complementary in taper with the tapered conical outer sealing surface portion 84 of the male locking connector 80 shown in FIG. 19 and for sliding, sealing air-tight fit or engagement therewith in a slight interference fit assuring a secure connection.

Figure 21:
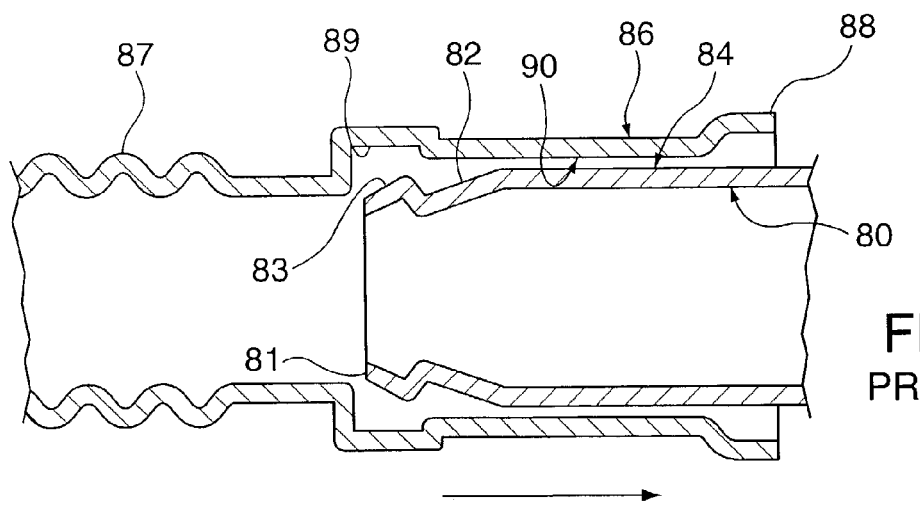
FIG. 21 illustrates the fluid-tight sealing connection between a prior art locking male connector and a prior art locking female hose cuff.

The sealing or fluid-tight locking fit or connection between the male locking connector 80 and the female locking hose cuff 86 is illustrated diagrammatically in FIG. 21. Referring to FIG. 21, it will be understood that the outer outwardly extending annular end portion 88 of the female locking cuff 86 enables the female locking cuff to initially slide over the male locking connector 80 and as the female locking cuff 86 is pushed over the male locking connector 86 as indicated by the arrow in FIG. 21, the slightly conical sealing surface portions 90 and 84, respectively, of the female locking cuff and male locking connector slidably engage the above-noted slight interference fluid-tight fit or connection. It will be further understood that as the locking female cuff 86 is pushed over the locking male connector 80 the tapered edge 83 of the annular ridge 81 formed on the sealing connector 80 cams or slightly forces the portion of the female locking cuff providing the outwardly extending annular recess 89 radially outwardly after which such portion snap-fits over the male locking connector annular ridge 81 which is received within the recess 89 of the female locking cuff to lock the female locking cuff 86 and the male locking connector 80 in a locked sealing or fluid-tight engagement. It will be further understood from FIG. 21 that while the respective slightly conical sealing surfaces 90 and 84 are not shown in engagement, they are shown slightly separated, diagrammatically, for clarity of presentation and ease of understanding.

Figure 13:
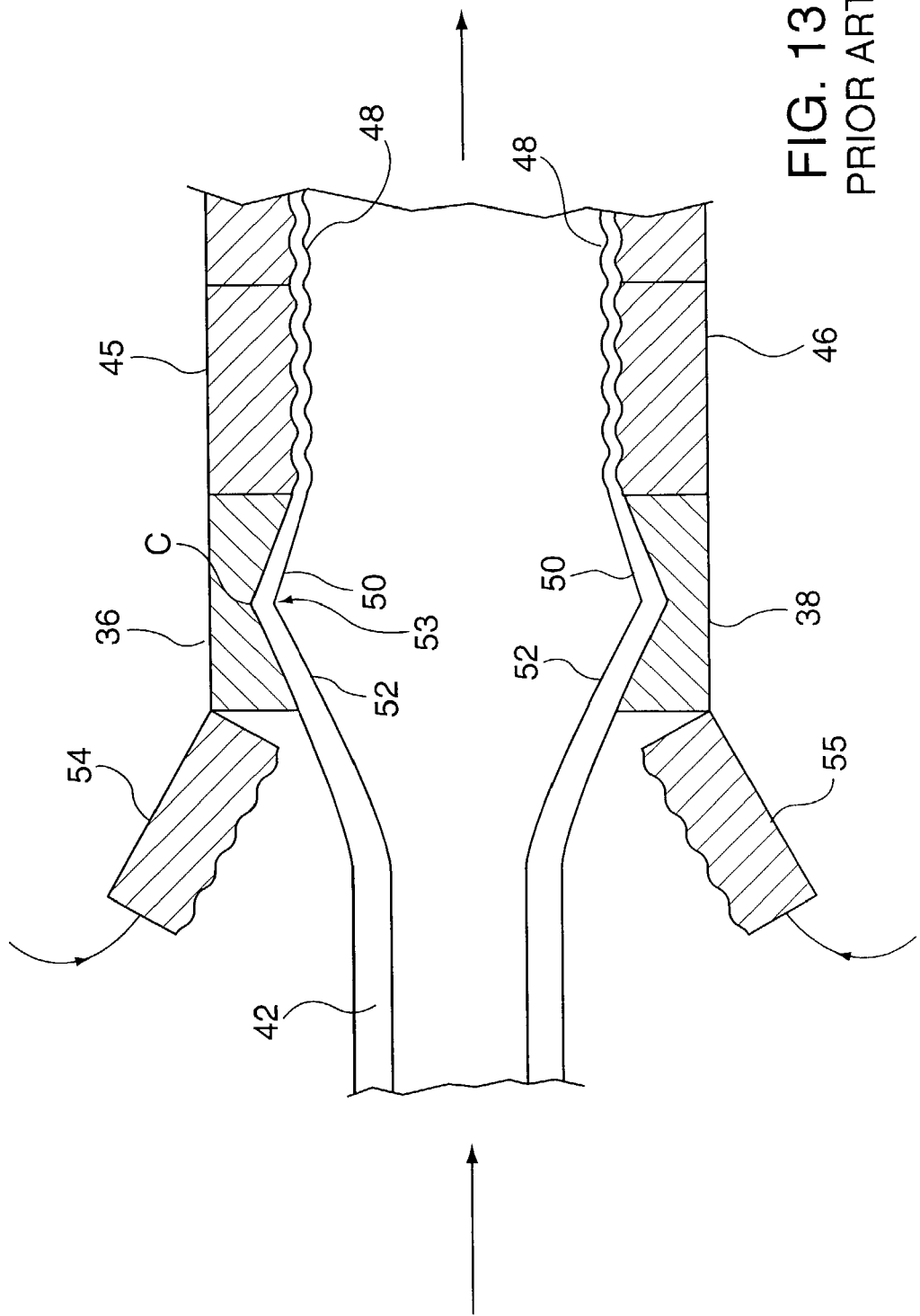
Figure 14:
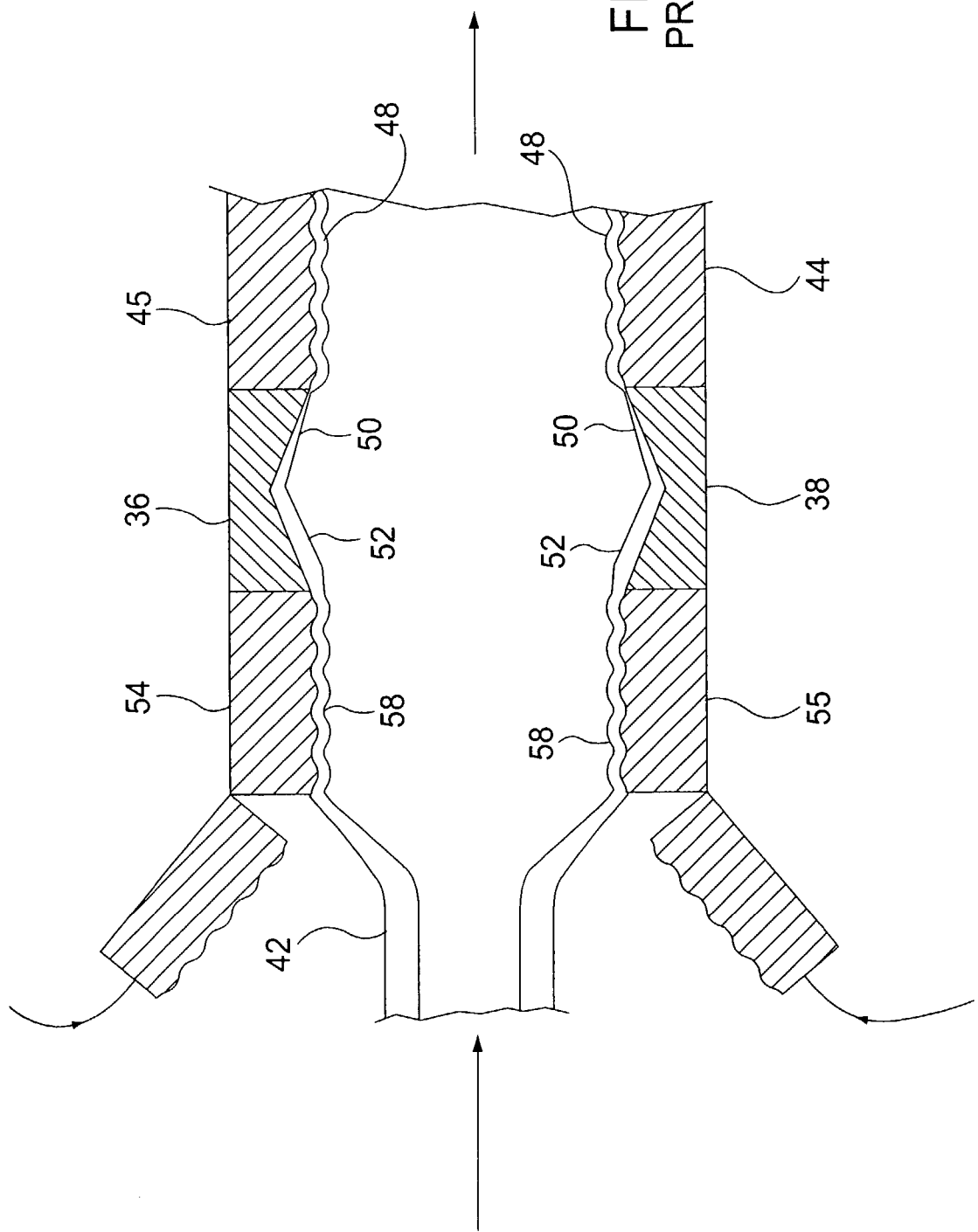

It is further known to the art to form the locking female cuff 86 of FIG. 20 as dual locking cuffs utilizing the apparatus and process illustrated diagrammatically in FIG. 3 but substituting opposed pairs of symmetrical dual female locking cuff forming blocks (not shown) for the symmetrical dual cuff forming blocks 26a and 26b shown in FIG. 3. It will be understood that such prior art symmetrical dual locking cuff forming blocks are symmetrical in the same sense that the dual cuff forming blocks 36 and 38 shown in FIG. 9 are symmetrical. It has been found that upon utilizing such prior art symmetrical dual locking cuff forming blocks the dual locking cuffs formed utilizing such prior art apparatus and high speed process form dual locking cuffs which increase in thickness in the direction opposite to the direction of forming as did the dual cuff 53 shown in FIG. 13 and described above. Such increase in dual locking cuff thickness, upon such dual female locking cuff being split transversely through its middle, also produces two unsatisfactory locking female cuffs, one slightly too large and one slightly too small, to engage a male locking connector, such as the male locking connector 80 shown in FIG. 19, in a locking fluid-tight fit or engagement.

Figure 22:
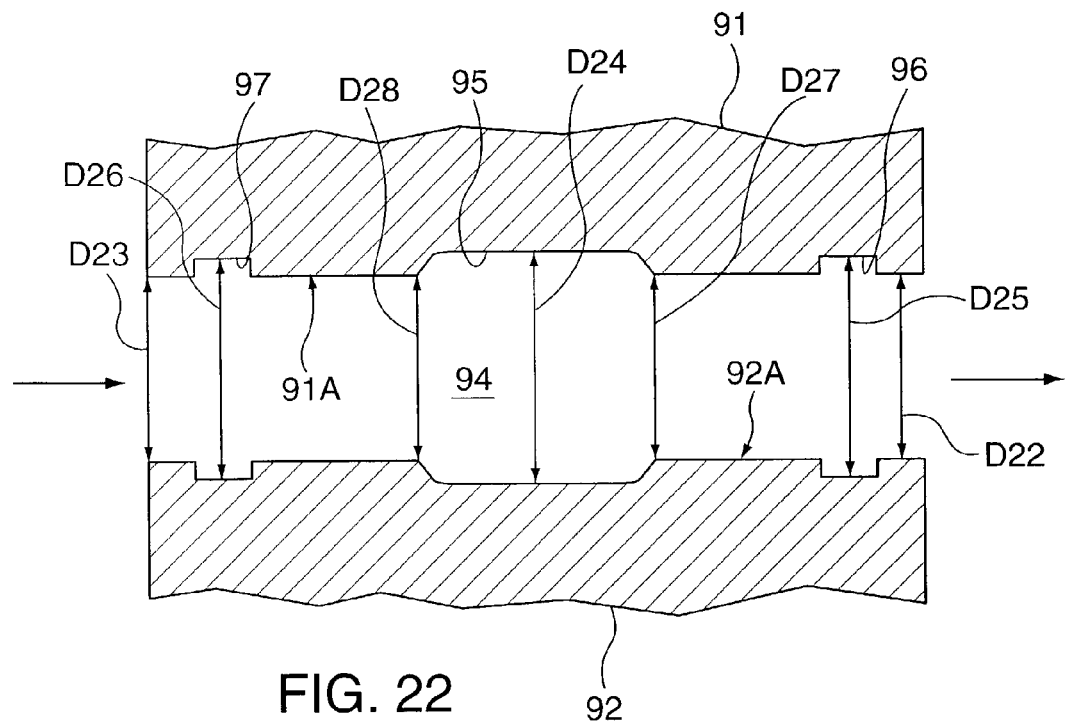
FIG. 22 is a partial cross-sectional view of asymmetrical cuff blocks of the present invention for forming locking female dual cuffs.
Figure 22A:
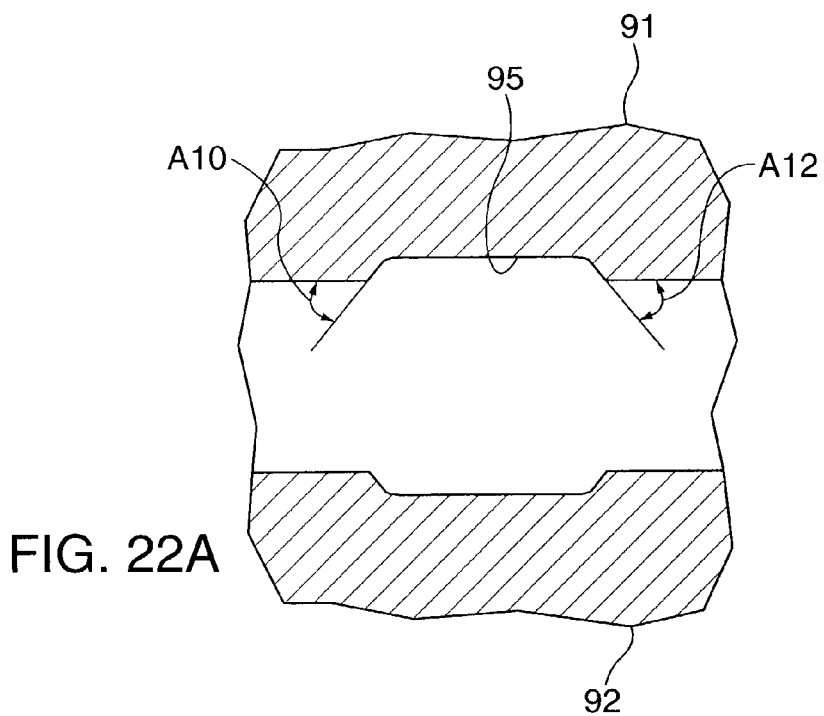
FIG. 22A is a partial view of FIG. 22 illustrating the common taper angles of the central recess shown in FIG. 22.

Asymmetrical dual locking cuff forming blocks 91 and 92 are shown in FIG. 22 which embody the present invention, which can be utilized to practice a further process of the present invention and which can be utilized to provide a pair of locking cuffs, or locking female hose cuffs formed by the process of the present invention. The pair of opposed dual locking cuff forming blocks 91 and 92 provide opposed asymmetrical dual locking female cuff forming surfaces, identified in FIG. 22 by respective general numerical designations 91A and 92A, providing a general cylindrical asymmetrical dual locking female hose cuff forming chamber indicated by general numerical designation 94. Chamber 94 has a leading end diameter D22, a trailing end diameter D23, a central recess 95 including a middle portion having a middle diameter D24, a first intermediate annular recess 96 intermediate the central recess 95 and the leading end and having a first intermediate recess diameter D25, a second intermediate annular recess 97 intermediate the central recess 95 and the trailing end and having a second intermediate recess diameter D26. The central recess 95 has a leading central recess diameter D27 and a trailing central recess diameter D28 larger than said leading central recess diameter 27. The leading diameter D22 is smaller than said middle diameter D24 and smaller than said trailing diameter D23. The first intermediate recess diameter D27 is larger than the leading end diameter, smaller than the middle diameter D24, smaller than the second intermediate recess diameter D26, and larger than the trailing diameter D23. The second intermediate recess diameter D26 is smaller than the middle diameter D24 and larger than the trailing diameter D23.

Figure 23:
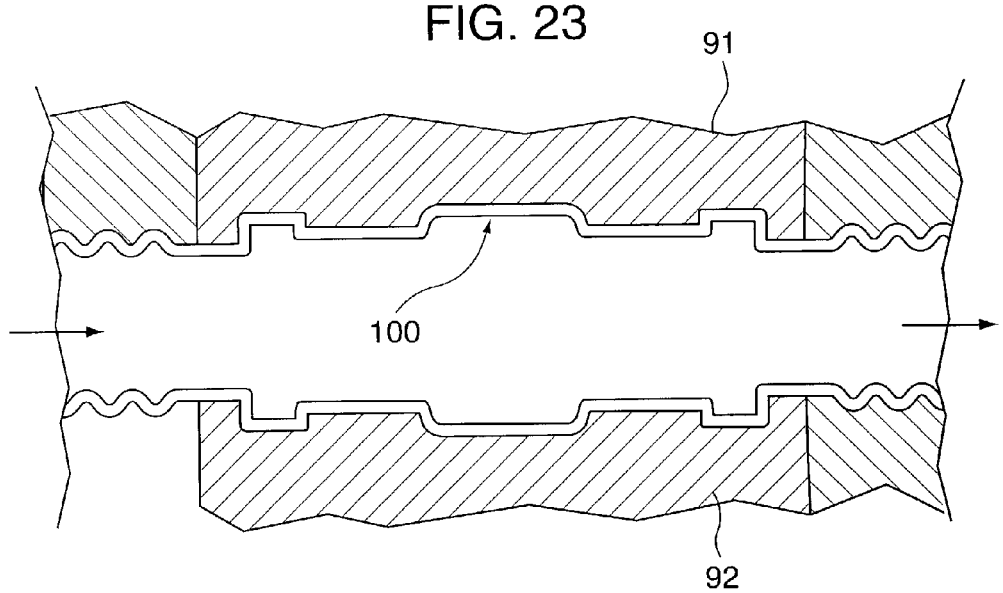
FIG. 23 is a partial cross-sectional diagrammatical view illustrating the forming of portions of two lengths of corrugated hose having a dual locking female cuff formed there between by the asymmetrical dual locking female cuff forming blocks of the present invention.
Figure 24:
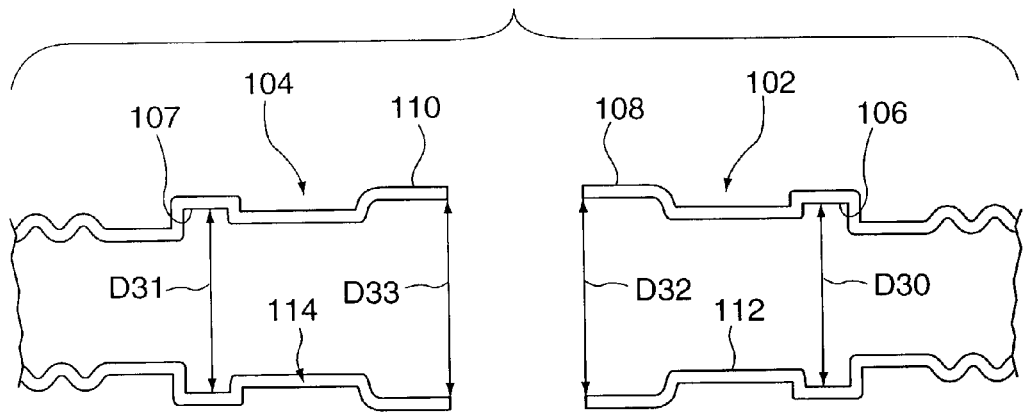
FIG. 24 illustrates the splitting of the dual locking female cuff shown in FIG. 23 into two locking female cuffs having the same internal dimensions, with one such cuff being provided on one end of one length of corrugated hose and the other cuff being provided on one end of another length of corrugated hose.

Upon the asymmetrical dual locking female hose cuff forming blocks 91 and 92 of FIG. 22 being substituted for the pair of symmetrical dual cuff forming blocks 26a and 26b in FIG. 3, and the trains of forming blocks 21 and 22 being operated as described above, lengths of corrugated hose and intermediate dual locking female hose cuffs are formed as indicated diagrammatically in FIG. 23. More particularly, the dual locking female hose cuff formed by the apparatus and process of the present invention employing the asymmetrical dual locking female hose cuff forming blocks form the dual locking female hose cuff shown in FIG. 23 and indicated by general numerical designation 100. As will be noted from FIG. 23, such dual locking female hose cuff 100 increases in thickness in a direction opposite to the forming direction indicated by the arrows in FIG. 23. As shown in FIG. 24, upon the dual locking female hose cuff 100 shown in FIG. 23 being split transversely along or through the middle diameter D24 (FIG. 22), two locking female hose cuffs indicated by general numerical designations 102 and 104 are provided. It will be further understood that due to the locking female hose cuffs 102 and 104 being formed with the asymmetrical dual locking female hose cuff forming blocks 91 and 92 (FIGS. 22 and 23), that even though the first formed locking female hose cuff 102 is generally smaller in thickness than the second formed locking female hose cuff 104, the internal dimensions of such locking female hose cuffs are the same. That is, the diameter D30 of the intermediate annular recess 106 of cuff 102 is the same as the diameter D31 of the intermediate annular recess 107 of the cuff 104 and the diameter D32 of the radially outwardly extending annular portion 108 of the cuff 102 is equal to the diameter D33 of the radially outwardly extending annular portion 110 of the cuff 104. Further, the slightly tapered inner conical sealing surface portion 112 of the cuff 102 has the same taper as the slightly tapered inner conical sealing surface portion 114 of the cuff 104. Accordingly, it will be further understood in accordance with the present invention that although the locking female cuffs 102 and 104 have differing thicknesses, their internal dimensions are the same whereby both locking female duffs 102 and 104 will sealingly engage in a locking fluid-tight fit or connection with a complementary shaped or dimensioned locking male connector of the type shown in FIG. 19 and described above.

In an embodiment of the pair of opposed dual locking female hose cuff forming blocks 91 and 92 shown in FIG. 23, the leading diameter D22 was 0.888", the first intermediate recess diameter D25 was 0.950", the leading central recess diameter D27 was 0.909", the middle diameter D24 was 0.990", the trailing central recess diameter D28 was 0.911", the second intermediate recess diameter D26 was 0.960" and the trailing diameter D23 was 0.905". The dual locking female hose cuff 100, FIG. 23, was made from a deformable hollow tube or parison of extruded polypropylene having an outer diameter of 0.40" and an inner diameter of 0.50" which material was advanced at a constant rate of 60' per minute.

Figure 7:
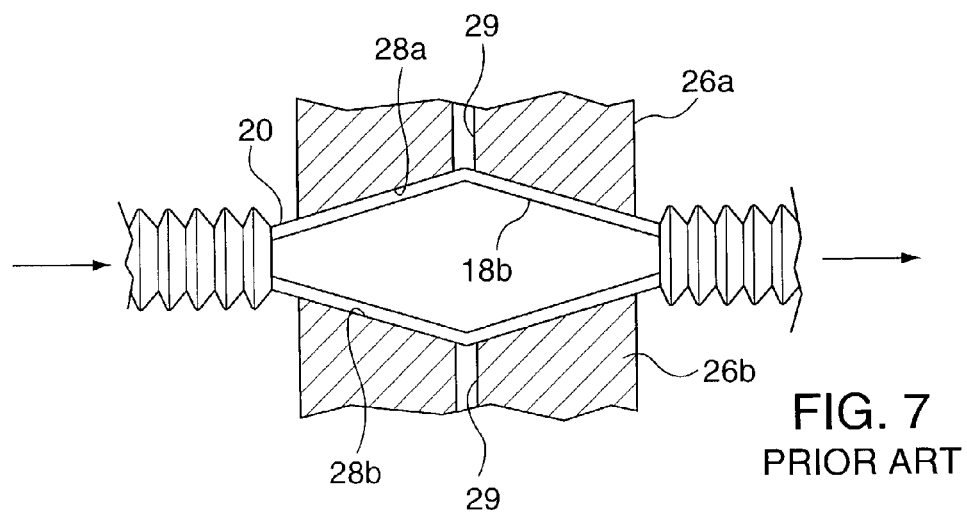
FIG. 7 is a partial diagrammatical cross-sectional view of prior art dual cuff forming blocks for forming a dual cuff using vacuum assisted blow molding or forming.
Figure 11:
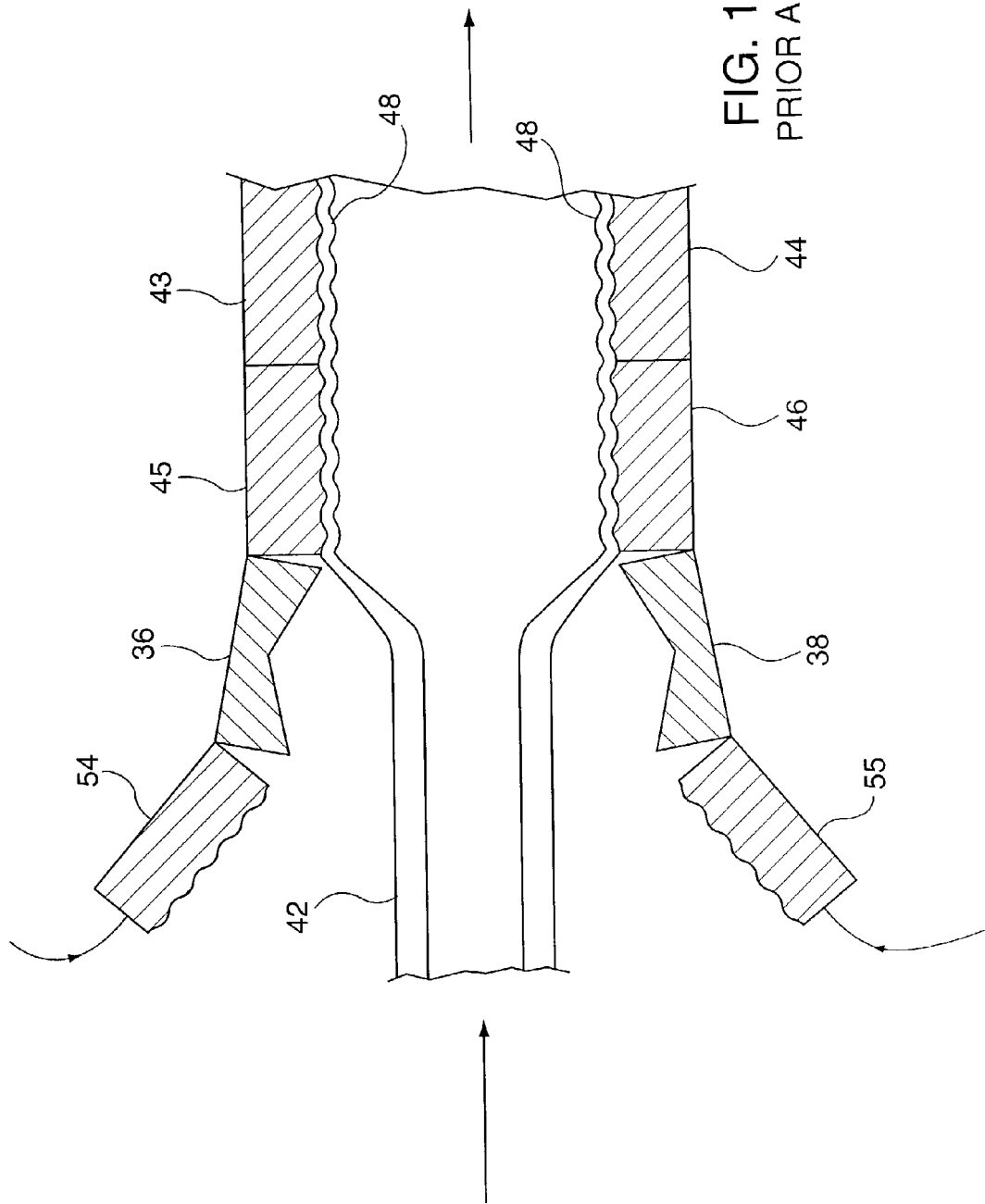
FIGS. 11–14 are sequential views, in partial cross-section, illustrating the prior art problem associated with forming dual cuffs having a thickness which increases in the direction of forming.
Figure 12:
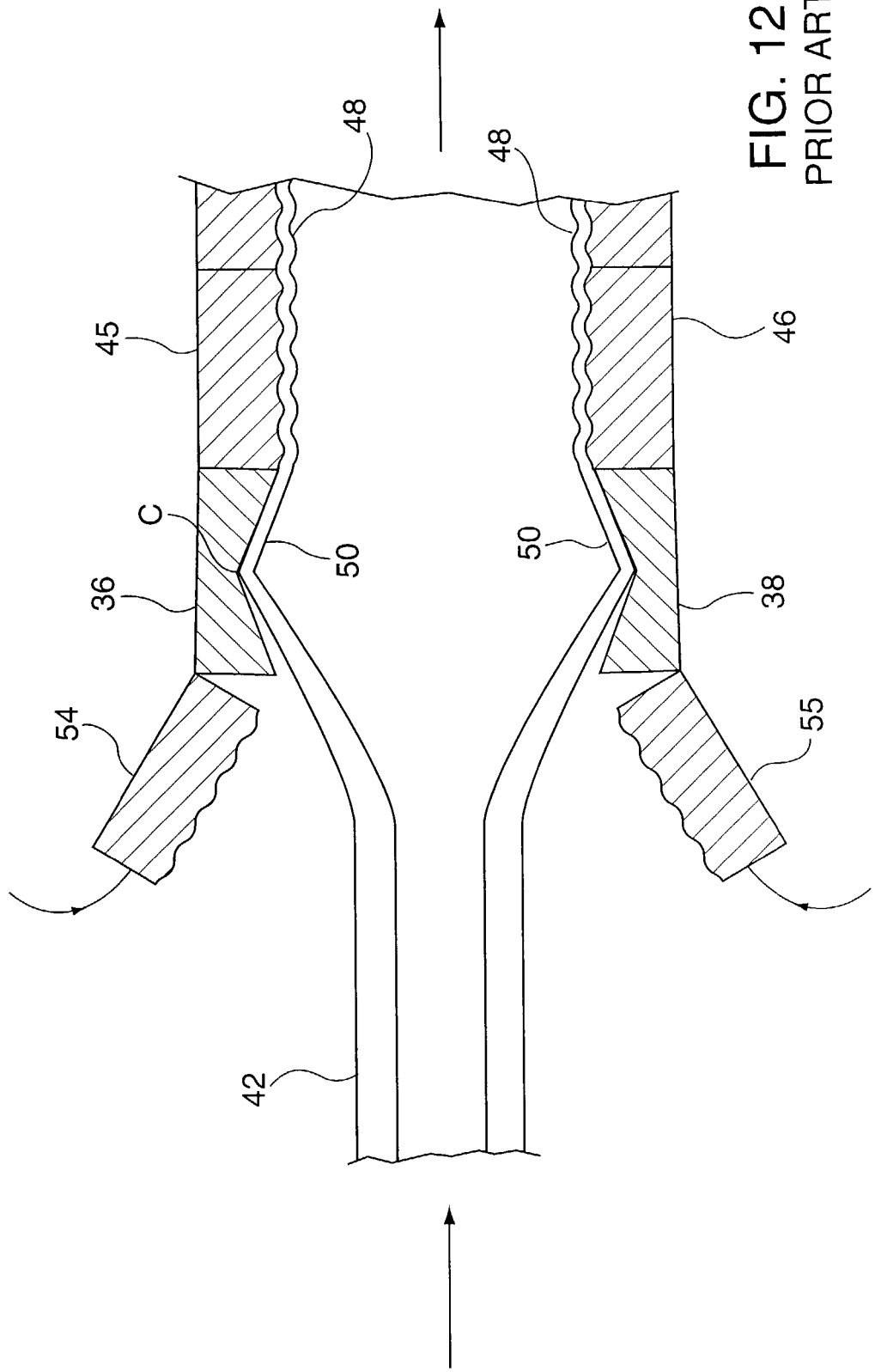

It will be understood that although not shown in FIGS. 15 and 22, the asymmetrical dual cuff forming blocks of the present invention also may be provided with vacuum lines, such as the vacuum lines 29 shown in FIG. 7, for utilizing vacuum assisted blow molding or forming to practice the present invention. In a still further embodiment of the present invention, the leading diameter D22 of the asymmetrical locking female dual cuff forming blocks 91 and 92 was the same as the trailing diameter D23; otherwise, the diameter dimensions were the same as shown in FIG. 22 and described above.

It will be understood by those skilled in the art that many variations and modifications may be made in the present invention without departing from the spirit and the scope thereof.

What is claimed is:

1. Apparatus for forming dual female hose-cuffs, comprising:
    a pair of dual cuff blocks for being placed in opposition to provide opposed asymmetrical dual female cuff forming surfaces providing a generally cylindrical asymmetrical dual female cuff forming chamber having a leading diameter, middle diameter and a trailing diameter, said middle diameter being larger than said leading diameter, said trailing diameter being larger than said leading diameter, and said trailing diameter being smaller than said middle diameter.

2. The apparatus according to claim 1 wherein said apparatus is for forming dual locking female hose-cuffs, wherein said chamber is a generally cylindrical asymmetrical dual locking female cuff forming chamber having a leading end having said leading diameter and having a trailing end having said trailing diameter, wherein said chamber has a central annular recess including a middle portion having said middle diameter, a first intermediate annular recess intermediate said central recess and said leading end and a second intermediate annular recess intermediate said central recess and said trailing end, said first intermediate annular recess having a first intermediate recess diameter and said second intermediate annular recess having a second intermediate recess diameter, said first intermediate recess diameter being larger than said leading diameter, smaller than said middle diameter and smaller than said second intermediate recess diameter, said second intermediate recess diameter being smaller than said middle diameter and larger than said trailing diameter, said central recess having a leading central recess diameter and a trailing central recess diameter larger than said leading central recess diameter.

3. The apparatus according to claim 2 wherein said central recess has a tapered leading surface and a tapered trailing surface, and wherein said tapered leading surface and said tapered trailing surface have a common taper angle.

4. The apparatus according to claim 3 wherein said common taper angle is about 45°.

* * * * *